United States Patent [19]

Truran

[11] Patent Number: 5,799,406
[45] Date of Patent: Sep. 1, 1998

[54] COORDINATE MEASURING MACHINE CERTIFICATION APPARATUS

[76] Inventor: Howard G. Truran, 47875 Five Mile Rd., Plymouth, Mich. 48170

[21] Appl. No.: 701,886

[22] Filed: Aug. 23, 1996

[51] Int. Cl.$^6$ .................................................. G01B 3/30
[52] U.S. Cl. ................................................ 33/502; 33/567
[58] Field of Search ........................... 33/502, 503, 567; 73/1.01, 1.79, 1.81

[56] References Cited

U.S. PATENT DOCUMENTS

| | | | |
|---|---|---|---|
| 2,645,023 | 7/1953 | Trbojevich | 33/567 |
| 3,162,955 | 12/1964 | Egli | 33/567 |
| 4,523,450 | 6/1985 | Herzog | 73/1.81 |
| 4,763,507 | 8/1988 | Zofchak | 33/502 |
| 4,932,136 | 6/1990 | Schmitz et al. | 33/502 |
| 4,962,591 | 10/1990 | Zeller et al. | 33/567 |
| 5,231,768 | 8/1993 | Beckwith, Jr. | 33/567 |
| 5,259,120 | 11/1993 | Chapman et al. | 33/502 |
| 5,430,948 | 7/1995 | Vander Wal, III | 33/502 |

FOREIGN PATENT DOCUMENTS

| | | | |
|---|---|---|---|
| 1138532 | 6/1957 | France | 33/502 |
| 4011890 | 10/1991 | Germany | 33/502 |

OTHER PUBLICATIONS

"CMM accuracy measurements", Quality magazine, Dec. 1986 (Hitchcock Publishing Company).

Primary Examiner—G. Bradley Bennett
Attorney, Agent, or Firm—Alex Rhodes

[57] ABSTRACT

An apparatus for certifying or calibrating a coordinate measuring machine. A plurality of elongated linear gage blocks, each of said gage blocks which have been certified as conforming in accuracy to a specified accuracy grade by a qualified measuring laboratory are mounted in a positioning device for selectively rotating the gage blocks about a vertical axis within a measurement volume of a coordinate measurement machine and selectively rotating the linear gage blocks about a horizontal axis within the measurement volume. The positioning device has a base for supporting the apparatus in the measurement volume, an upward extending column mounted on the base for rotating the gage blocks about the vertical axis, a holding device mounted on an upper portion of the column for mounting said gage blocks in the positioning device and rotating the gage blocks about the horizontal axis. In a second aspect of the invention the upper portion of the apparatus forms a pair of V-blocks for pre-aligning a probe with a small aperture or opening of a part during a measurement of the part.

14 Claims, 7 Drawing Sheets

COORDINATE MEASURING MACHINE CERTIFICATION APPARATUS

FIELD OF THE INVENTION

This invention relates to certifying coordinate measurement machines and more particularly to an apparatus with standard gage blocks for certifying and calibrating a coordinate measuring machine.

BACKGROUND OF THE INVENTION

Coordinate measuring machines are widely used in industry for checking the dimensions of production parts. They have an advantage over fixed gages of being capable of checking a large variety of parts. If properly used, they can eliminate investments in expensive gages and reduce the costs of skilled labor.

One aspect of coordinate measuring machines is that they must be periodically certified and/or calibrated to ensure the accuracy of measurements taken with the machines. Another aspect of coordinate measuring machines is that it is difficult to align with small holes and recesses of parts during measurements of the parts.

Some companies require their suppliers to frequently certify and report as to the accuracy of their coordinate measuring machines. For companies with limited resources, this imposes a heavy burden, requiring them to either pay for the certification services of third parties or purchase expensive certification apparatus. More and more companies are demanding that their suppliers adopt plans for periodically certifying coordinate measuring machines to reduce warranty costs and satify demands by customers for improved quality. The certification of a coordinate measuring machine (CMM} generally consists of using standard measuring instruments or special apparatus for taking and comparing measurements at various locations within a measurement volume of the machine. Standard measuring instruments are inefficient and time consuming. Special apparatus and methods are excessively expensive, often inexact or difficult to use.

ANSI/ASME Standard B89.1.12M-1985; U.S. Pat. No. 4,962,591; and U.S. Pat. No. 5,430,948 are exemplary of the prior art of coordinate measuring machine certification apparatus and methods.

The ANSI/ASME Standard requires two separate gages for certifying a coordinate measuring machine. One gage is a "ball bar" gage consisting of a bar with balls mounted at opposite ends. The ball bar gage is usually mounted on an available stand and a probe of the CMM is moved to contact the ball diameters. The process is repeated at various locations of the CMM and each set of measurements is compared with the previous sets.

The second gage is a "step block" gage. The "step block" gage is positioned with an inspection stand on the three coordinate axes of the machine and measurements are taken of the steps to determine the linear accuracy and repeatability of the CMM. The ANSI/ASME Standard is time consuming subject to the inaccuracies of the "ball bar" and "step block" gages and mounting devices.

The Zeller et al. U.S. Pat. No. 4,962,591 discloses a complex calibration test member having a plurality of precision balls. The test member is measured at alternate positions, using the method described by Kunzmann and F. Waldele in the article, "Two-Dimensional Test Bodies for Determination of the Measurement Properties of Coordinate Measurement Instruments", Transactions of the International Convention on ""Modern Manufacture and Manufacturing Measurement Technique", Apr. 2–4, 1986, Polytechnical University of Vienna.

Vander Wal, U.S. Pat. No. 5,430,948 discloses a CMM certification apparatus having a single fixed length ball bar mounted at a mid position on a positioning device.

SUMMARY OF THE INVENTION

The present invention overcomes the deficiencies of the current art by using linear gage blocks to certify and calibrate coordinate measuring machines. An improved positioning device is also provided for rotating the gage blocks about a pair of coordinate axes. Gage blocks can be economically manufactured and machined to extremely close tolerances for parallelism, squareness and surface finish.

Moreover, their dimensions can be certified as conforming to desired accuracy grades by the U.S. Bureau of Standards and other qualified measuring laboratories. Another advantage is that variations in length due to temperature changes can be easily calculated.

Another feature of the invention is that a means is provided for pre-aligning a CMM probe with a small hole or opening during a measurement of the part.

In a first aspect of the invention, a stack of certified elongated gage blocks of varied lengths are clamped in a positioning device. The positioning device is comprised of a base; a column mounted on the base; and a device attached to an upper end portion of the column for holding the gage blocks. Another feature of the invention is that the gage blocks are rotatable about two orthogonal axes. During a certification or calibration of a CMM the gage blocks are rotated within a measurement volume of a CMM by rotating the column about a vertical axis and rotating the gage block holding device about a horizontal axis. Means are provided on the base and the upright member for fixing and indicating the positions of the gage blocks with respect to the vertical and horizontal axes. Another feature is that means are provided for indexing the gages blocks about the vertical and horizontal axes in equal increments.

In a second aspect of the invention, an upper portion of the caliper provides a "V-Block" for pre-aligning a probe of a CMM with a hole or a small opening.

Further objects, benefits and features of the invention will become apparent from the ensuing detailed description and drawings which disclose the invention. The property in which exclusive rights are claimed is set forth in each of the numbered claims at the conclusion of the detailed description.

BRIEF DESCRIPTION OF THE DRAWINGS

The invention will be better understood and further objects, characterizing features, details and advantages thereof will appear more clearly with reference to the diagrammatic drawings illustrating a presently preferred specific embodiment of the invention by way of non-limiting example only.

DETAILED DESCRIPTION OF PREFERRED EMBODIMENT

Referring now to the drawings wherein like numerals designate like and corresponding parts, a coordinate measuring machine certification apparatus 20 is shown in FIGS. 1 through 10, inclusive, according to the present invention. The certification apparatus 20 is comprised of a stack of certified elongated gage blocks 21a, 21b, and 21c mounted in a positioning device 22. As used herein, the term "certified gage block" refers to a gage block having at least one pair of parallel faces spaced apart a distance which has been certified by the U.S. Bureau of Standards or another qualified measuring laboratory as conforming to a specified accuracy grade.

A further benefit of the apparatus 20 is that it can be stored within a measurement volume of a coordinate measuring machine for periodic certification and/or calibration of the machine. A still further benefit of the apparatus 20, as will be later shown, is that it can be adapted for aligning a CMM probe with a small hole or opening. A still further advantage is that the gage blocks 21a, 21b, and 21c can be removed for re-certification or for replacement with other gage blocks.

Figures 1, 2:
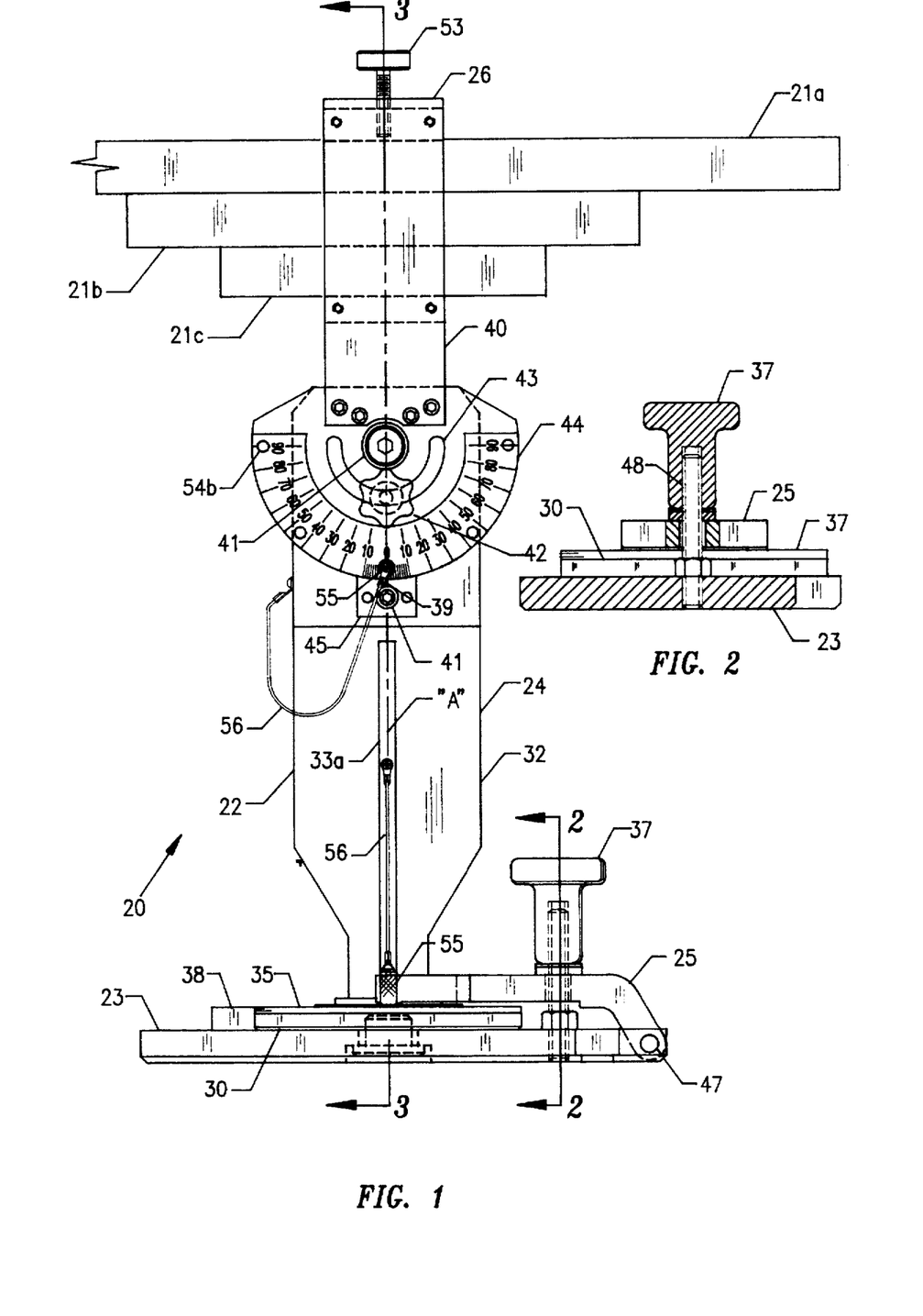
FIG. 1 is a front elevational view of a certification apparatus according to the invention.
FIG. 2 is a cross-sectional view taken on the line 2—2 in FIG. 1.
Figures 3, 4:
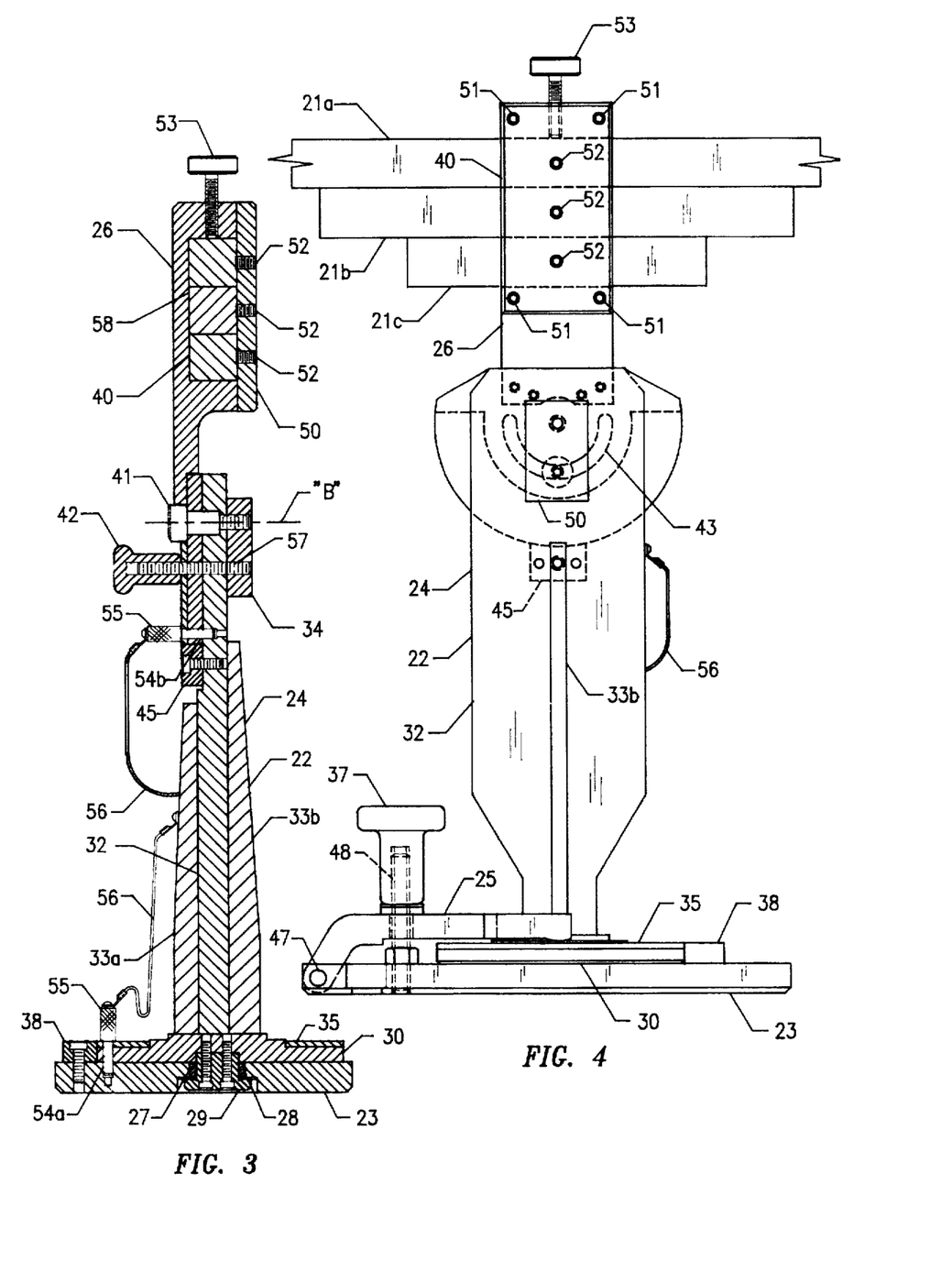
FIG. 3 is a cross-sectional view taken on the line 3—3 in FIG. 1.
FIG. 4 is a rear elevational view of the certification apparatus.
Figures 5, 6, 7:
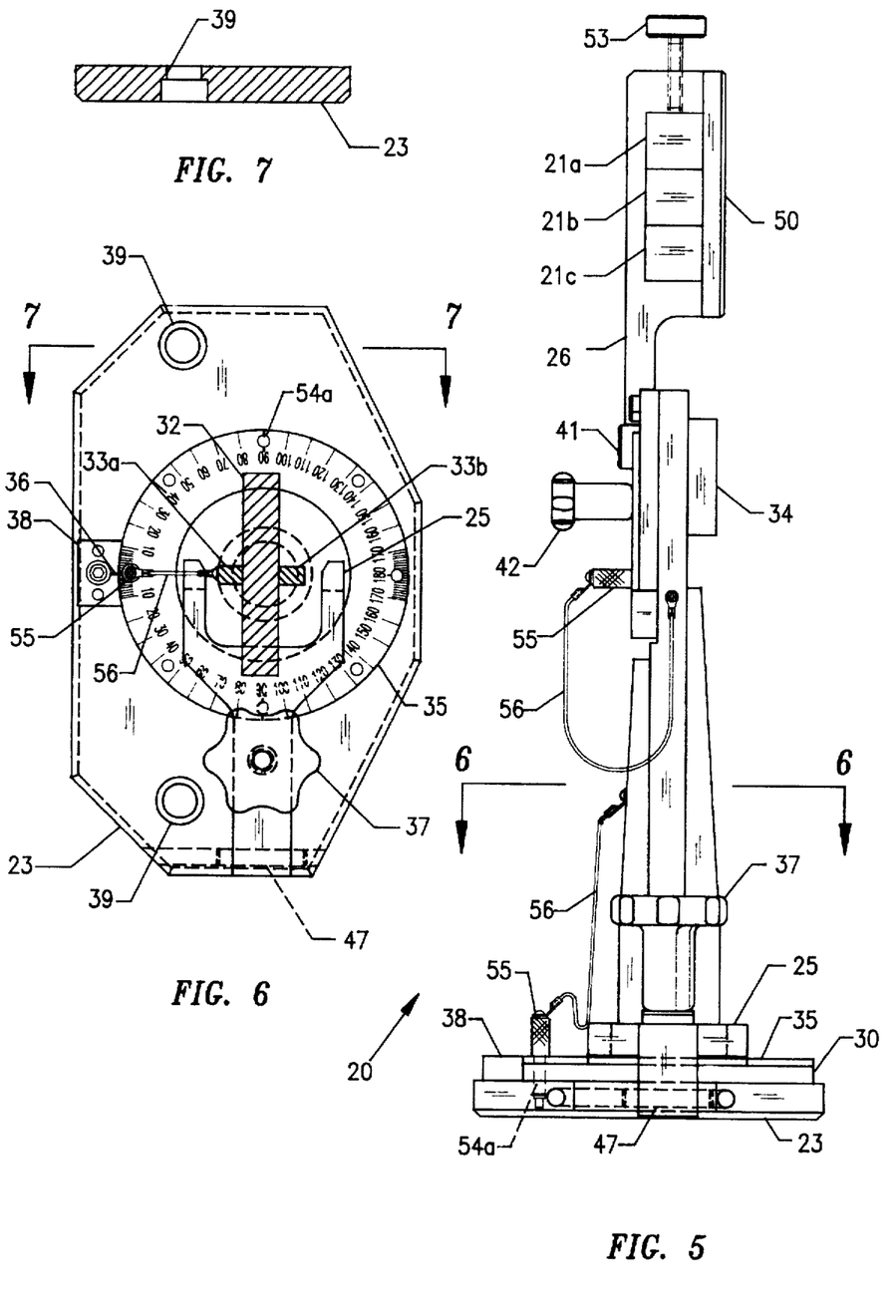
FIG. 5 is a left side elevational view of the certification device.
FIG. 6 is a cross-sectional view taken on the line 6—6 in FIG. 5.
FIG. 7 is a cross-sectional view taken on the line 7—7 in FIG. 5.
Figure 8:
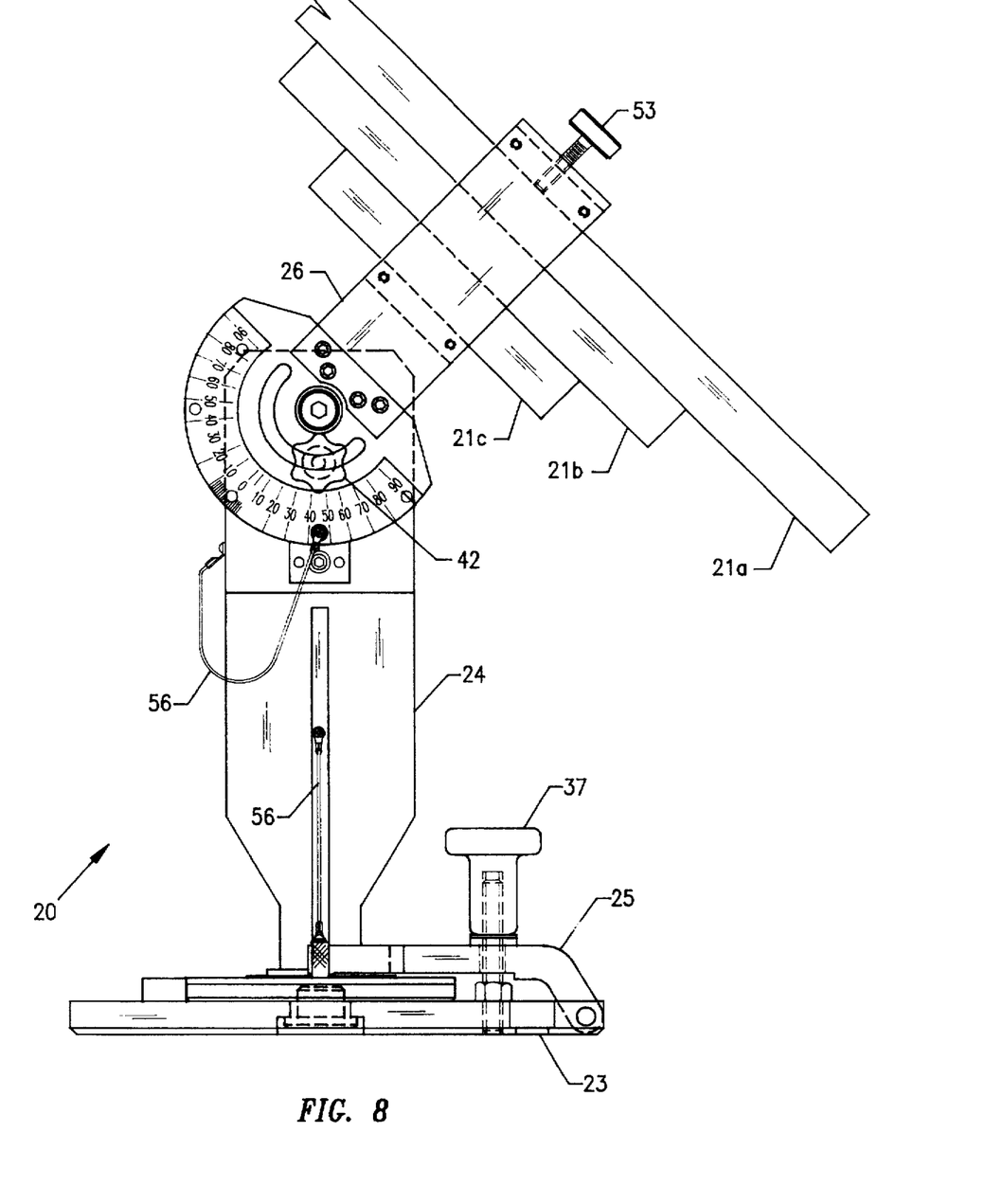
FIG. 8 is a front elevational view of the certification apparatus with a portion of the apparatus in a rotated position.
Figure 9:
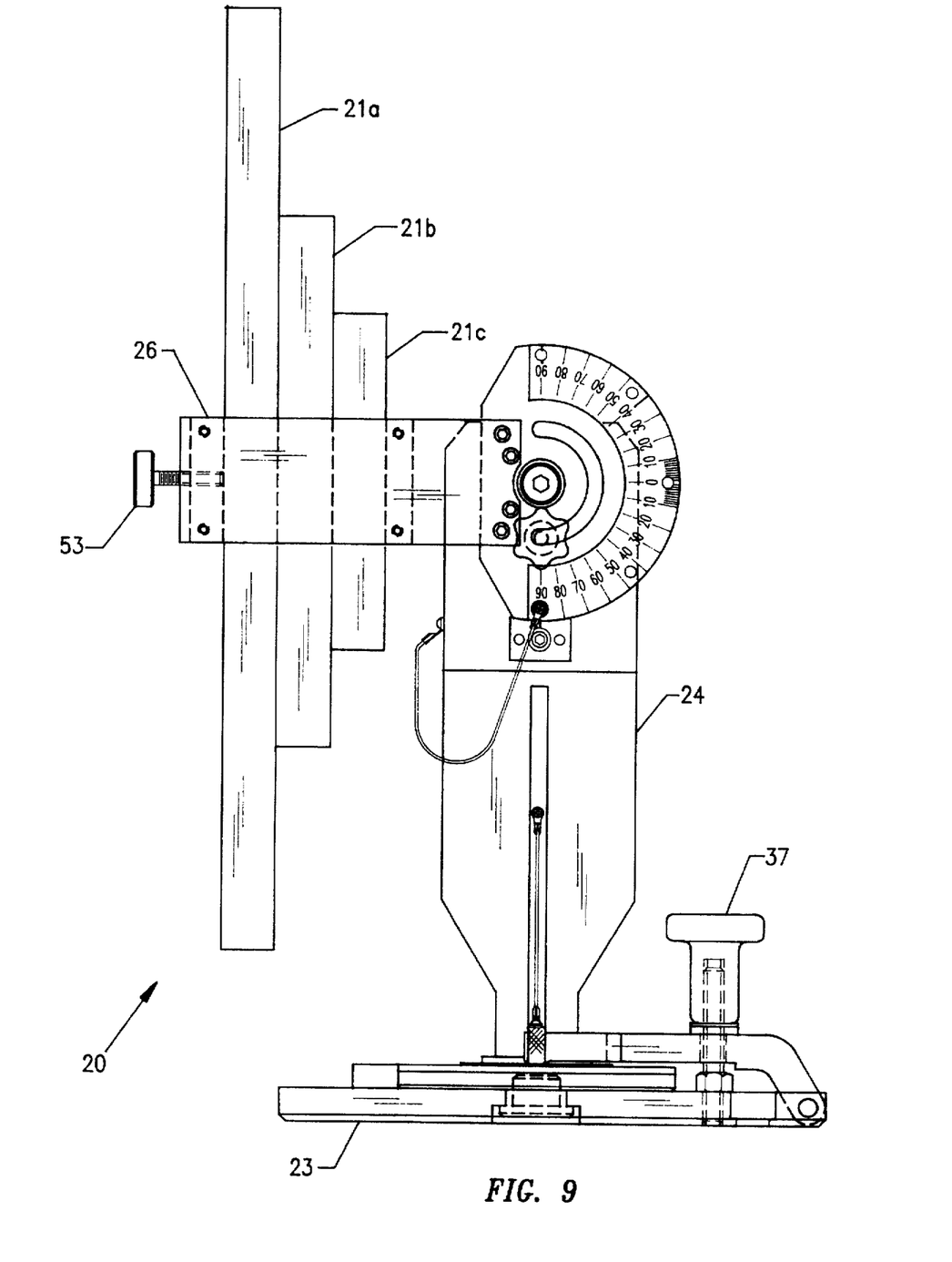
FIG. 9 is a front elevational view of the certification apparatus with the same portion of the apparatus in another rotated position.
Figure 10:
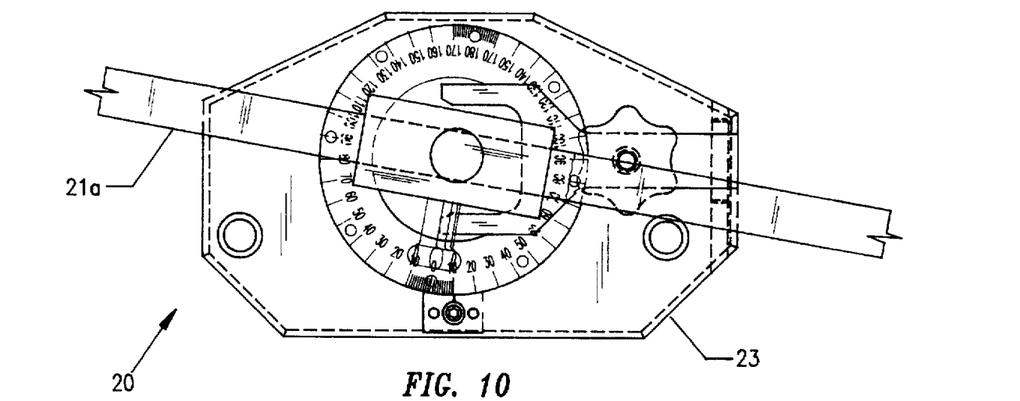
FIG. 10 is a plan view of the certification apparatus with a portion of the apparatus in a rotated position.

With reference to FIGS. 1 and 3, the positioning device 22 is comprised of a base 23, a column 24 mounted on the base 23 which is rotatable about a vertical axis "A"; and a holding device 26 mounted on an upper portion of the column 24 which is rotatable about a horizontal axis "B". In the embodiment 20 depicted in FIGS. 1 through 10, the holding device 26 is a caliper type device 26.

The base 23 is a generally rectangular plate with a pair of apertures 39 for optionally attaching the apparatus 20 to a coordinate measuring machine (not shown). In a center portion of the base 23, is an aperture 27 for rotatably mounting the column 24 on the base 23. In the aperture 27 is a bushing 28 which receives a keeper 29 for attaching the column 24 to the base 23. The keeper 29 is fixed to the column 24 and rotates in the bushing 28. A bar clamp 25 is pivotally attached to the base 23 for fixing the column 24 to the base 23.

The column 24 is comprised of a lower plate 30, a vertical plate 32 extending upwardly from the lower plate 30, two gussets 32a and 32b, and a tapping plate 34 fixed to an upper portion of the vertical plate 32. A protractor 35 is attached to the lower plate 30 and rotates with the column 24 about the vertical axis "A". Also attached to the lower plate 30 and adjacent to an edge of the protractor 35 is a set block 38. The set block 38 has an index mark 39 for indicating the position of the gage bars with respect to the vertical axis "A".

Above the bar clamp 25 is a hand knob 37 which engages a stud 48. The stud 48 is attached to the base 23 and extends upwardly through the bar clamp 25 to engage the hand knob 37. The bar clamp 25 is pivotally attached to the base 23 with a pin 47. The column 24 is fixed to the base 23 by tightening the hand knob 37 against the lower plate 30. The holding device 26, which is mounted on the column 24, is comprised of a "C" shaped caliper 40 and a plate 50. A lower portion of the caliper 40 is attached to the column 24 for rotation about the horizontal axis "B" with a socket head shoulder screw 41. The socket head screw 41 threadably engages the tapping plate 34 on the rear side of the column 24. On the front side of the column 24, directly below the socket head-screw 41, is a hand knob 42. The hand knob 42 is attached to a stud 57 which is anchored in the tapping plate 34. The stud 57 extends through an arcuate slot 43 of a second protractor 44 to engage the hand knob 42. The holding device 26 is fixed to the column 24 by tightening the hand knob 42 against the protractor 44.

The upper protractor 44 is attached to the caliper 40. The protractor 44 rotates with the holding device 26 about the horizontal axis "B" and is used for indicating the position of the gage blocks 21a, 21b and 21c with respect to the horizontal axis "B". Below the upper protractor 44 is a set block 45 with an index mark 46 for indicating the position of the gage blocks with respect to the axis "B".

Referring to FIGS. 1, 3 and 4, the gage blocks 21a, 21b and 21c differ in length and are retained in the caliper 40 by a rectangular plate 50 which is attached to the rear of the caliper 40 with four socket head screws 51. Three socket head set screws 52 extend through the plate 50 and contact the rear faces of the gage blocks 21a, 21b and 21c. A thumb screw 53 extends through an upper portion of the caliper 40 and contacts the upper gage block 21a. The functions of the three set screws 52 and the thumb screw 53 will be disclosed in proper sequence.

With reference to FIGS. 1, 3, 5 and 6, two sets of index holes 54a and 54b and a pair of index pins 55 are provided for indexing the gage blocks 21a, 21b and 21c about the vertical axis "A" and horizontal axis "B" in equal increments. The lower set of index holes 54a extend through the lower protractor 35, plate 30 and into the base 23. The upper index holes 54b extend through the upper protractor 44, caliper 40 and into the vertical plate 32 of the column 24. A flexible cable 56 extends from an attachment to each of the index pins 55 to an attachment to the column 24. The cables 56 prevent the pins 55 from being lost.

The apparatus 20 is used as follows. After the accuracy of the gage blocks 21a, 21b and 21c has been certified as conforming to a specified grade by a qualified measurement laboratory, by way of example, the U.S. Bureau of Standards, the gage blocks 21a, 21b and 21c are installed in the recessed portion 57 of the holding device 26 as shown in FIG. 1. The plate 50 is attached to the caliper with four screws 51. Thereafter the front and rear faces of the blocks 21a, 21b and 21c are horizontally aligned by advancing the set screws 52 in the plate 50 until the gage blocks 21a, 21b and 21c (without exerting undue force on the gage blocks) contact the vertical face 58 of the recess 57. The upper and lower faces of the gage blocks 21a, 21b and 21c are brought into close contact and the blocks 21a, 21b, and 21c are fixed in the recess 57 by tightening a thumb screw 53 on the upper portion of the caliper 26.

After the gage blocks 21a, 21b and 21c have been installed, the apparatus 20 is positioned within the measurement volume of a CMM. Measurements are taken by contacting the end, upper, lower and side faces of the gage blocks 21a, 21b and 21c with the probe. Further measurements are taken by rotating the column 24 and caliper 26 as shown in FIGS. 1, 8, 9 and 10 to re-position the gage blocks 21a, 21b and 21c in the measurement volume. Each set of measurements is compared with previous sets to certify the accuracy and repeatability of the machine. If the sets of measurements do not agree, the CMM is calibrated with the apparatus 20.

Figures 11, 12:
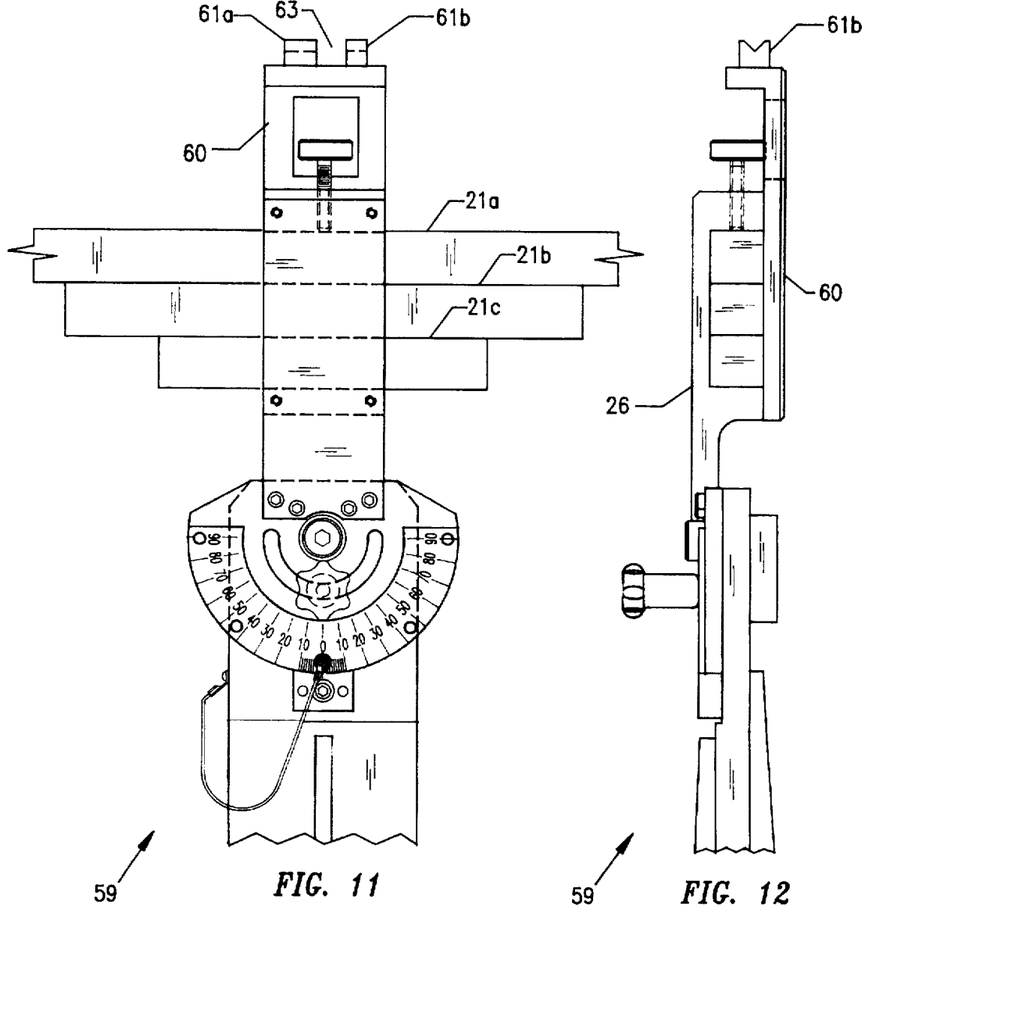
FIG. 11 is a fragmentary front elevational view of an alternate embodiment of the certification apparatus.
FIG. 12 is a left side elevational view of FIG. 11.
Figure 13:
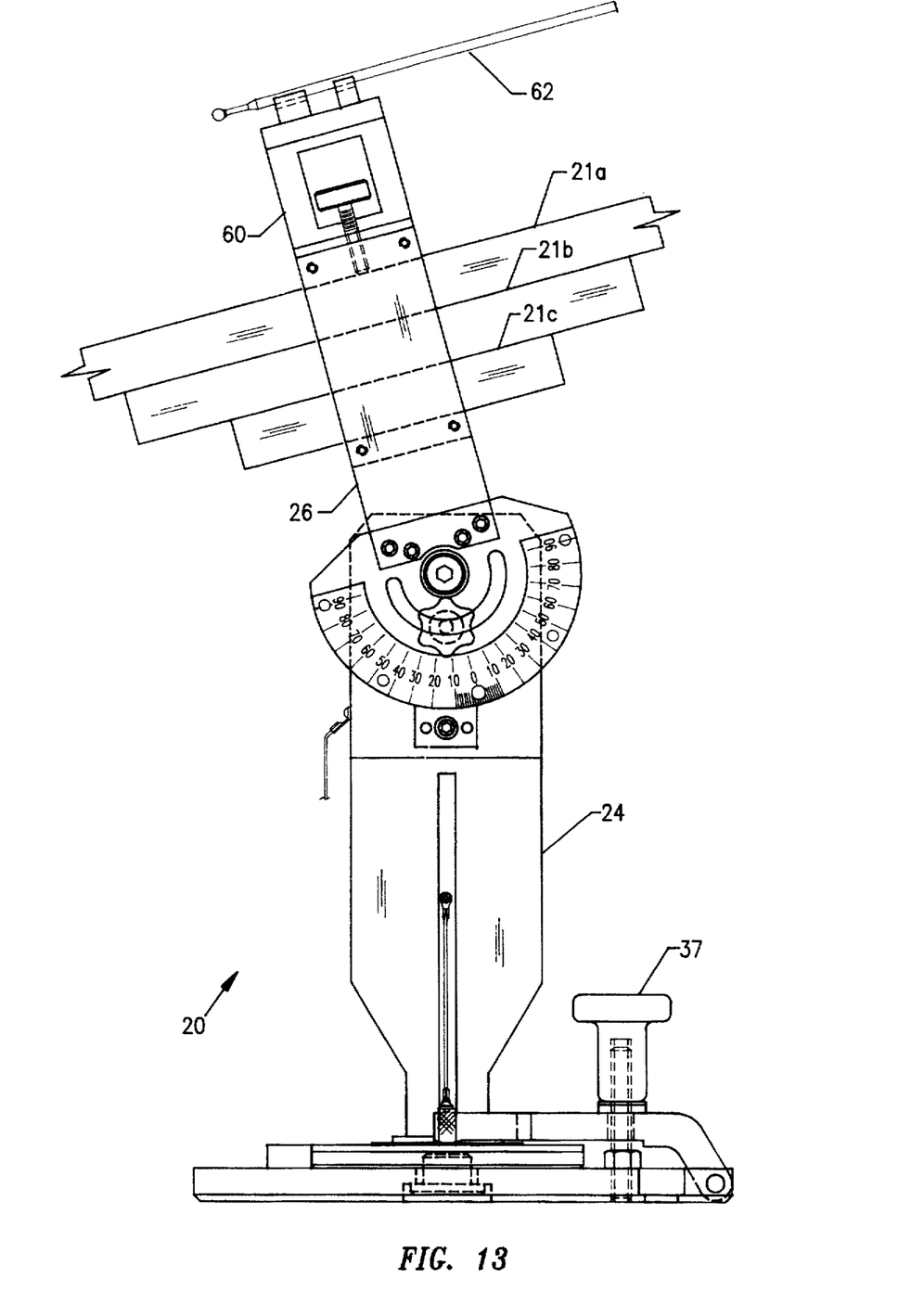
FIG. 13 is a front elevational view of the alternate embodiment with a portion of the apparatus in a rotated position.

Referring now to FIGS. 11 through 13, an embodiment 59 is shown which also serves to align a CMM probe with a small hole or space of a part during a measurement of the part. The plate 60 is extended upward and forms a pair of spaced apart V-Blocks 61a and 61b. A probe 62 is aligned as shown in FIG. 13, by setting the caliper 60 at a designated angle and resting the probe 62 in the V-Blocks 61a and 61b. A space 63 between the V-Blocks 61a and 61b is provided to clear a ball end portion of a small probe. In such case, the ball end portion of the small probe will lie in the space 63 between the V-Blocks 61a and 61b.

From the foregoing, it is apparent that my invention provides a means for certifying and taking measurements on coordinate measuring machines and pre-aligning which is affordable, accurate and easy to use.

Although only two embodiments have been disclosed, it is not my intention to limit my invention to these embodiments since other embodiments can be derived by obvious changes in materials, size, shape, arrangement, substitution and addition of parts without departing from the spirit thereof.

I claim:

1. An apparatus for certifying or calibrating a coordinate measuring machine comprising: a plurality of elongated linear gage blocks, each of said gage blocks having a pair of end faces spaced apart a distance which has been certified as conforming in accuracy to a specified accuracy grade by a qualified measuring laboratory; and a positioning device for selectively rotating said gage blocks about a vertical axis within a measurement volume of a coordinate measurement machine and selectively rotating said linear gage blocks about a horizontal axis within said measurement volume, said positioning device having a base for supporting said apparatus in said measurement, an upward extending column mounted on said base for rotating said gage blocks about said vertical axis; a holding device mounted on an upper portion of said column for mounting said gage blocks in said positioning device and for rotating said gage blocks about said horizontal axis; a means for indicating a position of said gage block with respect to said vertical; a means for indicating a position of said gage block with respect to said horizontal axis; and separate means for fixing said gage blocks with respect to each of said axes.

2. The apparatus as recited in claim 1 further comprising a means for indexing said linear gage blocks in equal increments about said vertical axis and a means for indexing said linear gage block in equal increments about said horizontal axis.

3. The apparatus as recited in claim 1 wherein said holding device is a caliper shaped member having a lower portion for mounting said holding device on said column, an open recessed portion for receiving said linear gage blocks; and a plate attached to said caliper for retaining said gage blocks in said recessed portion of said caliper.

4. The apparatus as recited in claim 1 further comprising a means for fixing a position of said linear gage blocks with respect to said vertical axis and a means for fixing a position of said gage blocks with respect to said horizontal axis.

5. The apparatus as recited in claim 4 wherein said means for fixing said position of said linear gage block with respect to said vertical axis is a bar clamp attached for rotation to said base for rotation about a horizontal axis and a hand knob for engaging said bar clamp with said column.

6. The apparatus as recited in claim 1 further comprising a means on said holding device for pre-aligning a probe of said coordinate measuring machine with a small hole or opening of a part during a measurement of said part.

7. The apparatus as recited in claim 6 wherein said means for pre-aligning a probe comprises an upward extending portion of said holding device, said upward extending portion having at least one V-shaped depression for supporting said probe.

8. An apparatus for certifying or calibrating a coordinate measuring machine comprising: a means for mounting said apparatus within a measurement volume of said coordinate measuring machine; at least one elongated linear gage block mounted in said apparatus, said gage block having a pair of end faces spaced apart a distance which has been certified as conforming in accuracy to a specified accuracy grade by a qualified measuring laboratory; a means for selectively rotating said gage in said apparatus about a vertical axis; and a means for rotating said linear gage block in said apparatus about a horizontal axis.

9. The apparatus as recited in claim 8 wherein said apparatus has a stack of thickness linear elongated gage blocks, each of said gage blocks having a front face, a rear face spaced apart substantially the same distance as the remaining gage blocks, and a pair of parallel end faces spaced apart a distance which has been certified by said qualified measuring laboratory as conforming in accuracy to said specified accuracy grade.

10. The apparatus as recited in claim 9 wherein said stack of linear elongated gage blocks is comprised of a first linear gage block, a second linear gage block having a length which is shorter than said second gage block; and a third gage block having a length which is shorter than said second gage block.

11. The apparatus as recited in claim 9 further comprising a means in said holding device for aligning said front and rear faces of said gage blocks when said gage blocks are installed in said holding device.

12. The apparatus as recited in claim 9 further comprising a means for indicating the angular position of said gage blocks with respect to said vertical axis and a means for indicating the angular position of said gage blocks with respect to said horizontal axis.

13. An apparatus for certifying or calibrating a coordinate measuring machine comprising: a plurality of linear elongated gage blocks, each of said gage blocks having at least one pair of spaced apart faces at a distance which has been certified by a qualified measuring laboratory as conforming in accuracy to a specified accuracy grade; a positioning device for supporting said apparatus within a measurement volume of a coordinate measurement machine and selectively rotating said linear gage block about a vertical axis or selectively rotating said linear gage block about a horizontal axis, said positioning device having a means for indexing said gage block about said vertical axis in equal increments and a means for indexing said gage block about said horizontal axis in equal increments.

14. The apparatus as recited in claim 13 further comprising a means for pre-aligning a probe of said coordinate measuring machine during a measurement of said part with a small opening or space of said part.

\* \* \* \* \*

UNITED STATES PATENT AND TRADEMARK OFFICE
CERTIFICATE OF CORRECTION

PATENT NO. : 5,799,406
DATED      : September 1, 1998
INVENTOR(S): Howard G. Truran It is certified that error appears in the above-indentified patent and that said Letters Patent is hereby corrected as shown below:

Column 4, line 3, after mark, change "39" to --36--

Signed and Sealed this

Tenth Day of November 1998

Attest:

BRUCE LEHMAN

*Attesting Officer*     *Commissioner of Patents and Trademarks*